E. PLOURDE.
BABY CARRIAGE.
APPLICATION FILED JUNE 29, 1909.
958,307.
Patented May 17, 1910.
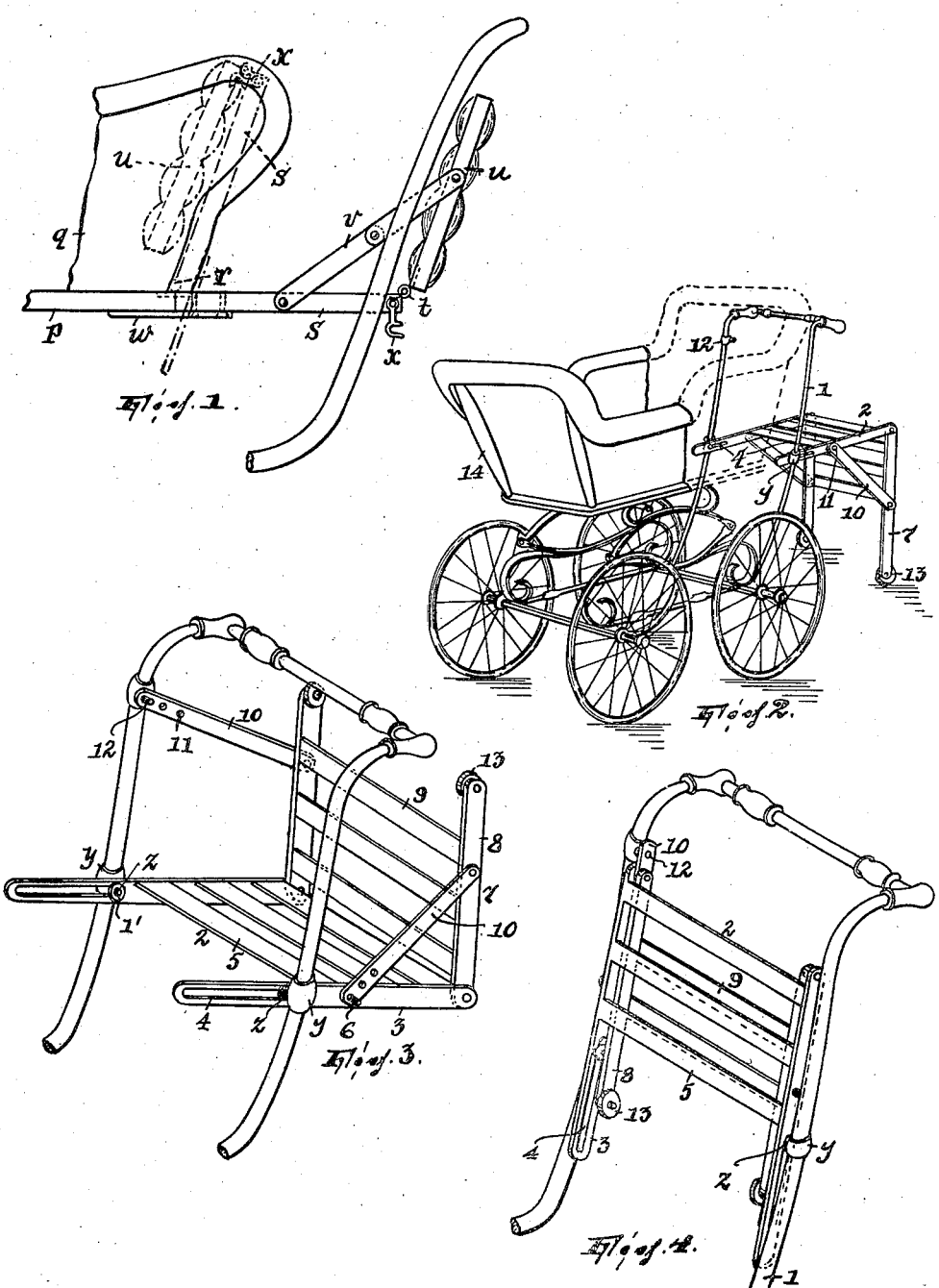

UNITED STATES PATENT OFFICE.

EUGENE PLOURDE, OF PATERSON, NEW JERSEY.

BABY-CARRIAGE.

958,307.  Specification of Letters Patent.  Patented May 17, 1910.

Application filed June 29, 1909. Serial No. 504,960.

*To all whom it may concern:*

Be it known that I, EUGENE PLOURDE, a subject of the King of England, residing in Paterson, Passaic county, New Jersey, have invented a certain new and useful Improvement in Baby-Carriages; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates to baby carriages and it has for its principal object to provide a vehicle of substantially this kind with an auxiliary pivoted seat, whereby the carriage will be convertible so as to accommodate either one or two occupants.

I have shown in the accompanying drawings two different embodiments of my invention both involving a common feature in which my invention broadly consists, to wit, a back member and a seat member pivotally connected together and one of them being pivoted in the carriage in such manner that the latter may be adapted for one occupant or for two, according to the position of said members.

Other objects will appear later in this specification or be apparent to those skilled in the art.

In the accompanying drawings, Figure 1 is a fragmentary view in side elevation of one embodiment of the invention; and, Figs. 2, 3, and 4, are views illustrating the second embodiment of the invention, Fig. 2 showing the same in isometric and Figs. 3 and 4 showing the essential parts of the invention in positions differing from each other and from that illustrated in Fig. 2.

In Fig. 1 the carriage body comprises the bottom *p* and sides *q*, and is open at the back. Pivoted to the back of the bottom *p* by means of hinge *r*, is a member *s*, and pivoted to the free edge of member *s*, as by hinges *t*, is an extension member *u* which may be upholstered. Folding braces, such as *v*, pivotally connect the members *s* and *u* to limit the backward movement of member *u*, and in order to limit the downward movement of member *s* to a position where it is alined with member *p*, a projection *w* may be secured to member *s* so as to bear against the under side of the bottom *p*. In the position shown in full lines, the members *s* and *u* afford additional room in the carriage body so that more than one occupant may be accommodated; the carriage may be adapted for only one occupant by buckling the braces *v* and folding member *u* against member *s* and then raising both into the dotted line position, where they may be held by a hook *x*.

In the construction shown in Figs. 2, 3 and 4, the parts are adapted so as to either increase the capacity of the carriage or provide a seat for the attendant. In this instance, two clips *y* having opposed pivots *z* are secured to the uprights 1 of the handle bars. The pivots *z* receive the thumb-nuts 1' serving to retain on the pivots the side bars of a seat member 2. Said member comprises the side bars 3 having the longitudinal slots 4 receiving the pivots *z*, and the slats 5 connecting the side bars. A stud 6 projects outwardly from each side bar. 7 is a back member comprising side bars 8 and slats 9, the side bars 8 being pivotally connected to the free ends of the side bars 3. A link 10 is pivoted to each side bar 8, and its free end has a hole 11 (Fig. 2) or several of them (Fig. 3) adapted to receive the stud 6; one of these links may also be adapted to receive a stud 12 projecting from one of the uprights 1 above the corresponding pivot *z*. At their free ends the side bars 8 carry the rollers 13.

As shown in Figs. 2 and 3, when the seat member is horizontal, the member 7 may be pivotally moved to extend either up or down with relation to member 2. When extended downwardly, the links 10 being engaged with the studs 6 and the rollers 13 resting on the ground, the attachment forms a seat for the attendant. When extending upwardly, one link 10 being engaged with a stud 6 and the other with the stud 12, the members are held in such relation as to form a seat and back for one occupant, the carriage body 14 accommodating another occupant. When not in use, the members 2 and 7 may be folded into the position shown in Fig. 4. This is accomplished by sliding member 2 inwardly on the pivots *z* when members 2 and 7 are in the relation shown in Fig. 2, then raising member 2 and allowing member 7 to fold against it, and then raising the right-hand link 10 and engaging it with the stud 12, in which position the link will hold the members 2 and 7 in the folded position shown in Fig. 4.

Having thus fully described my invention, what I claim as new and desire to secure by Letters Patent is:

1. The combination, with a baby carriage, of a back member and a seat member pivotally connected together, one of them being pivotally attached to the carriage, means for securing said members in their open relation, and means for limiting the downward movement of said members relatively to the carriage, substantially as described.

2. The combination, with a baby carriage, of a back member and a seat member pivotally connected together, the seat member being pivotally attached to the carriage, means for securing said members in their open relation, and a brace connecting the back member with the carriage, substantially as described.

3. The combination, with a baby carriage, of a member pivotally connected therewith and forming a seat, another member pivoted to the outer or free portion of the first member and movable into angular relation to the first member either one side or the other of the first member, a link adapted to secure said member in either relation to the first member, and another link adapted to be connected with the carriage to support said members, substantially as described.

In testimony, that I claim the foregoing, I have hereunto set my hand this 26th day of June, 1909.

EUGENE PLOURDE.

Witnesses:
JOHN W. STEWARD,
WM. D. BELL.